Nov. 19, 1940.   S. O. WHITE ET AL   2,221,899
BLOCKER SYNCHRONIZER
Filed June 11, 1938   2 Sheets-Sheet 2
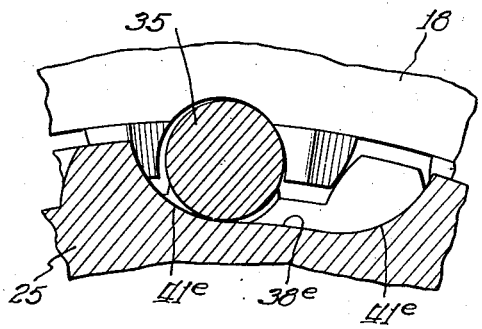
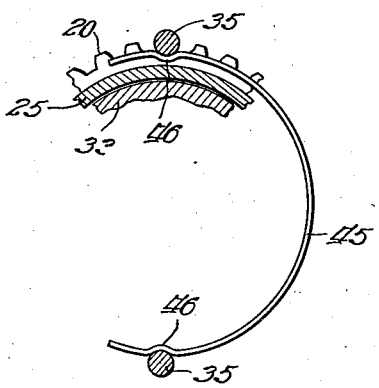
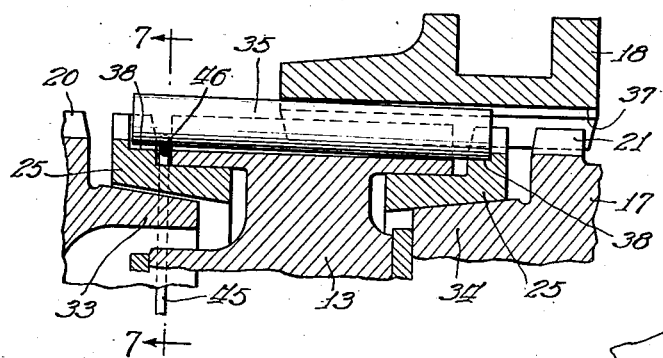
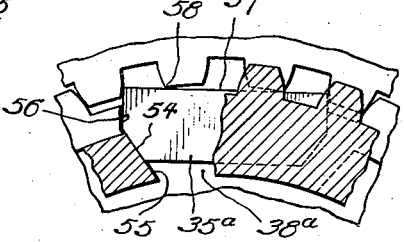
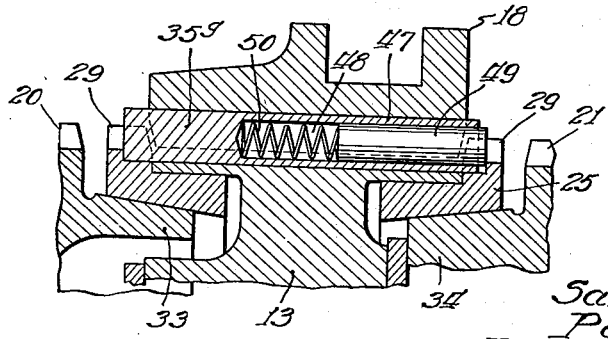
Inventors:
Samuel O. White and
Palmer Orr.
By: Edward P. Fitzhugh
Atty.

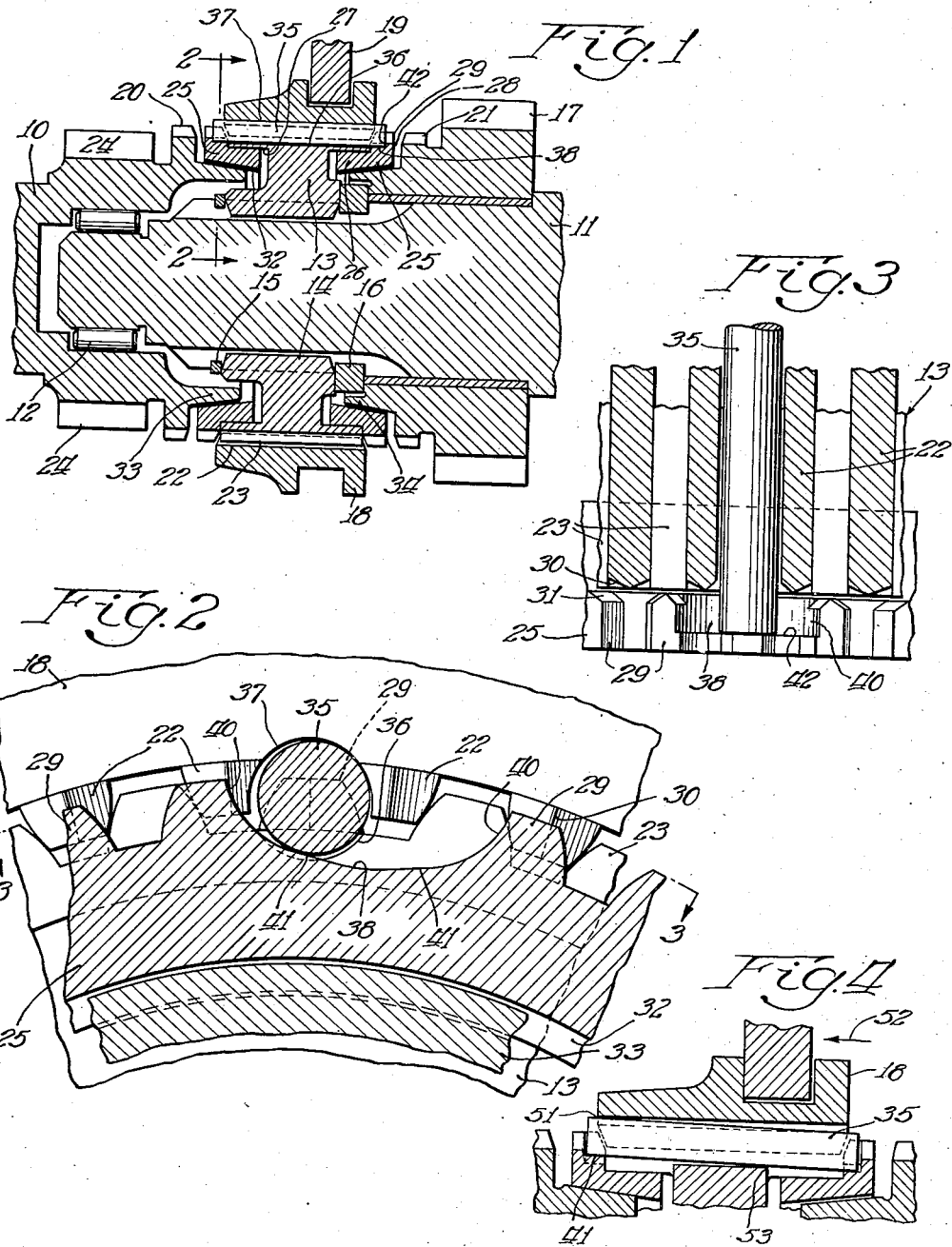

Patented Nov. 19, 1940

2,221,899

UNITED STATES PATENT OFFICE 2,221,899

BLOCKER SYNCHRONIZER

Samuel O. White and Palmer Orr, Muncie, Ind., assignors to Borg-Warner Corporation, Chicago, Ill., a corporation of Illinois Application June 11, 1938, Serial No. 213,132

23 Claims. (Cl. 192—53)

This invention relates to synchronizing change speed gear transmissions of the type employed, for example, in motor vehicles wherein there is provided means for effecting synchronization of a pair or pairs of torque-transmitting members preparatory to connecting said members in positive drive engagement with each other.

The invention is particularly directed to synchronizing transmissions of the type wherein the synchronizing means comprises friction clutch elements drivingly associated with the respective torque-transmitting members and adapted to be moved into engagement with each other in the initial stage of the shifting movement, and wherein there is incorporated so-called "blocker" mechanism for preventing the positive drive engagement of the members prior to the time that synchronization is effected.

An object of the invention is to provide a transmission synchronizer of this type, having a minimum number of parts, and which is extremely inexpensive and simple to manufacture.

Another object is to provide such a transmission synchronizer which requires a minimum of manual effort to effect blocking of the movable positive drive clutch member, to initiate operation of the synchronizing clutch, and to effect driving interengagement between the driving and driven elements of the transmission when synchronization has been attained.

In the past it has been universally considered necessary by manufacturers of automobiles and by manufacturers of transmission gearing, to employ between the movable clutch element and the thrust element of a synchronizing mechanism, a detent or poppet connection having a break-away action for the purpose of transmitting movement from said movable clutch element to said thrust element for developing axial pressure against the blocker synchronizer rings of the mechanism. In such mechanisms, after having effected synchronization by initial movement of the shifter member in the direction of the gear position that has been selected, it is necessary to increase the force exerted against the shifter member in order to effect the break-away release of the movable clutch member from the thrust element and allow the movable clutch element to advance through the blocker teeth of the blocker synchronizer ring into clutching engagement with the clutch teeth of the gear that has been selected.

One of the objects of the present invention is to provide a transmission of the type described above, in which the resistance to shifting of the movable clutch element is uniform and relatively low until the movable clutch element encounters the blocker mechanism, so that the only point of appreciable resistance to shifting will be that point at which the shifting operation must be halted until synchronization is complete, thus eliminating any confusion between the resistance offered by the detent or poppet mechanism and that which is set up by the blocker mechanism, and automatically reducing the resistance to a very low quantity when synchronization has been completed, thus to more definitely inform the operator that synchronization has been effected.

The foregoing objects are accomplished, in general, by the provision of a synchronizing transmission of the type referred to above, in which movement is transferred from the movable clutch element to the blocker-synchronizer ring by means of thrust members arranged to receive movement from the movable clutch element solely through the medium of a purely frictional engagement between coacting faces that are parallel to the direction of shifting movement. In particular, the invention provides an arrangement wherein the thrust-transmitting engagement between the thrust-transmitting means and the movable clutch element is varied roughly in accordance with the amount of relative rotation existing between the members to be synchronized, the thrust-transmitting means being urged under pressure into its frictional engagement with the movable clutch element while relative rotation exists, and such pressure being automatically relaxed when synchronization is attained, so as to substantially remove the frictional resistance to advance of the movable clutch element.

Other objects, the advantages and uses of the invention will become apparent after reading the following specification and claims, and after consideration of the drawings forming a part of the specification, wherein:

Fig. 1 is an axial sectional view through a transmission synchronizer embodying the invention;

Fig. 2 is a transverse sectional view thereof taken on the line 2—2 of Fig. 1;

Fig. 3 is a detail sectional view thereof taken on the line 3—3 of Fig. 2;

Fig. 4 is an axial sectional view, illustrating the operation of the invention;

Fig. 5 is a transverse sectional view through the hub and movable jaw clutch element of a modified form of the invention;

Fig. 6 is an axial sectional view of another modification of the invention;

Fig. 7 is a transverse sectional view taken as indicated by the line 7—7 of Fig. 6;

Fig. 8 is an axial sectional view of a further modified form of the invention; and Fig. 9 is a transverse sectional view of another modified form of the invention.

As illustrative of the general nature of the invention, reference may be made first to Figs. 1 and 2 of the drawings. The invention is therein shown as applied to the type of synchronizing transmission disclosed in the application of Samuel O. White, Serial No. 168,317, filed October 11, 1937. Such a transmission may include a torque-transmitting member 10, forming the rear end of the drive shaft of the transmission, and torque-transmitting members, including the driven shaft 11, piloted, as at 12, in the member 10, and the hub member 13 splined, as at 14, on the driven shaft 11 and secured against axial movement by retaining rings 15 and 16. A positive drive connection is adapted to be established between the torque-transmitting members 10 and 11, 13, or between the reduction geared torque-transmitting member 17 and the torque-transmitting members 11, 13, by an axially movable jaw clutch element 18, adapted to be shifted axially by a shifting fork 19 into positive clutching engagement with clutch teeth 20, formed on the torque-transmitting member 10, or clutch teeth 21 formed on the torque-transmitting member 17. To this end, the movable clutch element 18 is formed with internal clutch teeth 22, in sliding splined engagement with teeth 23 forming the periphery of the hub member 13, and adapted to engage the clutch teeth 20 or 21 when moved axially.

The torque-transmitting member 17 comprises part of a reduction gear train driven from a pinion 24 on the drive shaft 10, through the medium of a conventional countershaft, such as is shown in the White application above referred to. Upon being moved into clutching engagement with the clutch teeth 20, the clutch member 18 will receive rotation from the drive shaft 10 and transmit it directly through the hub 13 to the driven shaft 11. Upon being moved in the opposite direction into clutching engagement with the teeth 21, the clutch member 18 will receive rotation from the torque-transmitting member 17 through the countershaft just referred to, and will transmit it through the hub member 13 to the driven shaft 11.

In order to synchronize a torque-transmitting member 10 or 17 with the hub 13, preparatory to establishing such clutching engagement, we provide a pair of synchronizer rings 25 each including a substantially cylindrical collar portion 26 rotatably floating in an annular groove 27 extending axially into the hub member 13, and a radially outwardly extending flange 28 formed with blocker teeth 29 between which the teeth 22 of the movable clutch element must pass before the clutching engagement may be had with the clutch teeth 20 or 21. The opposed ends of the teeth 22 and 29 may be chamfered, as shown at 30 and 31 respectively in Fig. 3. The synchronizer rings 25 are provided with internal conical clutch faces 32 adapted to engage external conical clutch faces of coacting clutch elements 33 and 34 respectively, formed on the torque-transmitting members 10 and 17. The rings 25 are adapted to be located and supported by the clutch faces 33 and 34. Intervening oil films prevent destructive wear as a result of such supporting arrangement.

In order to effect initial clutching engagement between the friction clutch faces 33 or 34, and their cooperating friction faces 32 upon the rings 25, the rings 25 are moved axially by axial thrust transmitted to them from the movable clutch element through the medium of thrust members 35. The thrust members 35 are preferably cylindrical in form, and may be simply and inexpensively made by cutting sections from a cylindrical rod of cold rolled steel. They are mounted in substantially semi-cylindrical notches 37 formed in the interior of the shiftable clutch element 18, preferably in centered relation between two of the teeth 22. The intermediate regions of the thrust members are received in corresponding notches 36 in the hub 13. Their ends are received in elongated recesses 38 in the synchronizer rings 25. Between the center of each recess 38 and its curved end regions 40 are inclined ramps 41 which are adapted, when the synchronizer ring moves to either side of its centered position with respect to the movable clutch element, to engage the thrust members 35 and wedge them more tightly into their notches 37. The notches 37 are conformed closely to the surfaces of the thrust members 35 so as to give a relatively large area of engagement between the two.

Engagement of the ends of the thrust rods 35 in the recesses 38 provides lost motion connections between the synchronizer rings and the hub and movable clutch element, whereby a synchronizer ring may shift from a position in which the blocker teeth 29 are effective to block axial shifting movement of the movable clutch element 18, to a position in which it allows the movable clutch element to pass on into clutching engagement with a jaw clutch element 20 or 21. By thus utilizing the projecting ends of the thrust members for engagement in notches in the synchronizer ring, we eliminate the necessity of employing separate connecting means for establishing a lost motion connection between the blocker synchronizer ring and the hub. However, it is to be understood that the present invention is not intended to be limited to this type of lost motion connection.

In the initial stage of the shifting operation, frictional engagement of the thrust members 35 with the interior of the movable clutch element 18 causes the thrust members to be moved axially with the movable clutch element, so that pressure will be exerted by the ends of the thrust members 35 against a synchronizer blocker ring 25. The thrust thus transmitted by the thrust members 35 will develop an initial stage of frictional clutching engagement between the synchronizer ring and one of the driving members, which may, preferably, be only sufficient to bias the synchronizer ring to one limit of its lost motion connection.

This will establish the blocking relation of the teeth 29 with respect to the teeth 22, whereby continued pressure against the shift fork 19 will cause the movable clutch element to advance into engagement with the blocker synchronizer ring and to exert axial pressure thereagainst such as to establish the second stage of frictional clutching engagement, effective for causing the synchronizer ring and the driving member with which it is thus frictionally engaged, to approach the same speed of rotation.

When synchronization is reached, there will be a momentary reversal of the relative directions of rotation of the torque-transmitting members with relation to each other, causing the synchronizer ring to be oscillated toward its other limit of lost motion movement relative to the hub 13, and in so doing, it will reach a position wherein the internal teeth 22 of the shiftable clutch element 18 are in register with the spaces between the blocker teeth 29, whereupon the teeth 22 which have already commenced to move into such spaces owing to the chamfered faces 30 and 31 of the respective sets of teeth, will, under the continuous urging pressure of the shifting member 19, slide between the teeth 29 and into engagement with the now synchronized clutch teeth 20 or 21. In this stage of movement, the resistance to advance of the movable clutch element has been reduced to the relatively small resistance occasioned by frictional engagement between the thrust members and the movable clutch element. There is no occasion for overcoming the resistance of a spring detent connection between these two members. As a result, the completion of the shift is very smooth and easy.

The clearances between the friction clutch faces, when the movable clutch element is in neutral position, are preferably so arranged that a film of oil may exist between these faces and develop, under relative rotation thereof, a slight "oil drag", tending constantly to bias the synchronizer rings toward blocking positions.

Oil drag between the friction clutch faces tends to bias the synchronizer rings sufficiently to maintain the ramps 41 in engagement with the thrust members 35, whereby to assure contact between the latter and the notches 37, irrespective of speed of rotation, so that the thrust members will commence to exert thrust against a synchronizer ring when shifting movement commences.

The thrust elements 35 transmit thrust to the rings 25 by engaging against shoulders 42, formed by the recesses 38 being terminated short of the outer faces of the rings 25.

The engagement of the thrust members 35 by the ramps 41 causes the thrust bars to be wedged into increased frictional engagement with the notches 37, thereby increasing the amount of thrust that can be transmitted through the thrust members 35, such increase in thrust increasing the clutching action between the friction clutch faces which in turn increases the wedging action between the thrust members and the ramps 41. Thus it is possible to commence the synchronization with a very light clutching action which is rapidly built up as the operation proceeds, so as to produce a smooth acceleration of clutching action, and thereby effect synchronization in a minimum period of time, and yet with maximum smoothness. As the torque-transmitting members approach synchronization, however, the wedging pressure against the thrust members 35 will be relaxed, and at the moment of synchronization, will be fully released, owing to the shifting of the synchronizer ring back to the central position of its lost motion connection. This relaxation of wedging action will relax the retarding resistance to further axial movement of the shiftable clutch element relative to the thrust members which was produced by such wedging action, and under very light pressure of the shifting fork 19, the movable clutch element will advance through the blocker teeth into clutching engagement with the clutch teeth 20 or 21.

It is contemplated that the clearance between the thrust bars 35 and the notches 36, 37 and 38 respectively, may be such that during the wedging action hereinbefore referred to, the thrust bars may be tilted somewhat as indicated in Fig. 4, one end being raised by lifting action of a ramp 41, and the other end being allowed to drop into the central depressed region of its recess 38. The frictional contact of the edge of the movable clutch element, at 51, will thus be even more effective to move the thrust bar in the direction indicated by the arrow 52, than if the surface of the bar remained exactly parallel to the direction of movement. The bar may contact the hub, as at 53, without thereby developing any appreciable resistance to axial advance, since such contact would be only a brushing one as contrasted to the wedging contact at 51. Actually, the parts could be arranged so that there would be no contact at all between the hub and the thrust bars, as the bars could be supported by the synchronizer rings.

It would be possible to form the recesses 38 so as to be in substantial contact with the thrust members 35 at all times, as in the form shown in Fig. 5. In this form of the invention, we form the central regions of the recesses 38e with bottom surfaces curved coaxially with the major axis of the synchronizer, in order to allow the required lost motion shifting of the synchronizer ring relative to the thrust members. The curved end regions of the notches 38e form regions 41e which function as ramps to produce the wedging action described with reference to Figs. 1 to 3.

For some installations, it may be desirable to provide means for lightly spring-urging the thrust bars into engagement with the movable clutch element. Such means may comprise, as shown in Figs. 6 and 7, an annular or semi-annular spring 45 of light spring wire, mounted just ahead of the hub 13, between the latter and a synchronizer ring 25, and provided with indented portions 46 in engagement with one end of the respective bars 35, so as to urge the bars radially outwardly. Thus the bars may engage the movable clutch element 18 with sufficient frictional engagement to perform the necessary transmission of thrust, irrespective of the speed of rotation of the parts.

Another advantage of this form of the invention arises from the fact that when the movable clutch element 18 is shifted into positive clutching engagement with the teeth 21 of the torque-transmitting member 17, the springs 45 will tilt the bars 35 slightly, so that their ends opposite the springs will engage in the recesses 38, while their intermediate regions engage the corners formed between the notches 37 and the end of the movable clutch element 18. When the movable clutch element is returned to neutral position, its engagement with the bars 35 may tend to drag the synchronizer ring in engagement with the friction clutch element 34, out of clutch engagement.

In the modified form of the invention shown in Fig. 8, the thrust bars 35g are each formed in telescoping sections including a shell member 47 having a bore 48, and a plunger 49 mounted in the bore 48 and urged outwardly by a light compression spring 50, received in the bore 48. Thus the thrust bars 35g serve to exert a very light axial pressure against the synchronizer rings 25, sufficient to produce a constant light engagement between the friction clutch faces resulting in a drag which serves to bias the synchronizer rings constantly in blocking relationship, for the purposes set forth with respect to the form shown in Fig. 1.

The thrust bars need not necessarily be cylindrical. For example, in the form of the invention shown in Fig. 9, the bars 35a are relatively wide and flat, with bevelled corners 54 engaging bevelled end faces 55 of the synchronizer ring notches 38a. The square edge faces 56 are adapted to engage the side faces of separated teeth 22 of the movable clutch element 18, and the outer faces 57 are adapted to engage the corners of intervening teeth, as at 58. The bars may be radially supported and circumferentially positioned, either by resting in suitable depressions in the hub (not shown), or by the provision of bottoms in the notches 38a, as in the form shown in Figs. 1 and 2.

Biasing of the synchronizer ring will cause inclined faces 55 of notches 38a to engage bevelled corners 54 of the bars 35a, so as to exert a camming action against the bars, tending to rotate them around their longitudinal axes, into binding engagement with the teeth 22 of the movable clutch element.

A device constructed in accordance with the present invention is of maximum simplicity and cheapness of construction. Savings are effected by eliminating the necessity of lugs on the synchronizer rings for providing lost motion connections, by eliminating springs, by eliminating poppet constructions, and by providing thrust members which can be produced simply by sawing sections from a rod of cold rolled steel. The semi-circular notches, for example the notch 37 in the shiftable clutch element of Figs. 1 to 3 inclusive, may be broached with the same tool that broaches the internal teeth 22. The rings 25, which preferably are of bronze, may be cast, and the recesses 38 formed in the casting operation.

We claim:

1. In a synchronizing transmission, a pair of axially aligned torque-transmitting members, movable jaw clutch and synchronizer elements drivingly associated with one member, said clutch element being movable axially and said synchronizer element being adapted to be urged under axial pressure into positive clutching and frictional driving engagement, respectively, with jaw and friction clutch elements drivingly associated with the other member, and a thrust element arranged to transmit axial thrust to said synchronizer element and to frictionally engage an interior surface of said movable clutch element with a radially outwardly directed pressure developed as a result of relative rotation between said synchronizer element and the member with which it is engaged so as to receive axial thrust from said movable clutch element.

2. In a synchronizing transmission, a pair of axially aligned torque-transmitting members, movable jaw clutch and synchronizer elements drivingly associated with one member, said clutch element being movable axially and said synchronizer element being adapted to be urged under axial pressure into positive clutching and frictional driving engagement, respectively, with jaw and friction clutch elements drivingly associated with the other member, and a thrust element arranged to transmit axial thrust to said synchronizer element and to frictionally engage an interior surface of said movable clutch element with a radially outwardly directed pressure developed as a result of relative rotation between said synchronizer element and the member with which it is engaged so as to receive axial thrust from said movable clutch element, and to relax such engagement when synchronization is attained.

3. In a synchronizing transmission, a pair of axially aligned torque-transmitting members, movable jaw clutch and synchronizer elements drivingly associated with one member, said clutch element being movable axially and said synchronizer element being adapted to be urged under axial pressure into positive clutching and frictional driving engagement, respectively, with jaw and friction clutch elements drivingly associated with the other member, and a thrust element arranged to transmit axial thrust to said synchronizer element and to frictionally engage an interior surface of said movable clutch element with a radially outwardly directed pressure varying in intensity in response to variations in the rate of relative rotation between said synchronizer element and the member with which it is engaged, whereby to receive axial thrust from said movable clutch element.

4. In a synchronizing transmission, a pair of axially aligned torque-transmitting members, movable jaw clutch and synchronizer elements drivingly associated with one member, said clutch element being movable axially and said synchronizer element being adapted to be urged under axial pressure into positive clutching and frictional driving engagement, respectively, with jaw and friction clutch elements drivingly associated with the other member, and a thrust element associated with said synchronizer element so as to transmit axial thrust thereto and so as to receive radially outwardly directed thrust therefrom while relative rotation exists between said synchronizer element and its cooperating friction clutch element, whereby to frictionally engage an interior surface of said movable clutch element under pressure so that it may receive axial thrust from said movable clutch element.

5. In a synchronizing transmission, a pair of axially aligned torque-transmitting members, movable jaw clutch and synchronizer elements drivingly associated with one member, said clutch element being movable axially and said synchronizer element being adapted to be urged under axial pressure into positive clutching and frictional driving engagement, respectively, with jaw and friction clutch elements drivingly associated with the other member, and a thrust element associated with said synchronizer element so as to transmit axial thrust thereto and so as to receive radially outwardly directed thrust therefrom while relative rotation exists between said synchronizer element and its cooperating friction clutch element, whereby to frictionally engage an interior surface of said movable clutch element under pressure which will be relaxed when synchronization is attained, whereby said movable clutch element, as it is urged axially, will transmit to said synchronizer element axial thrust having an intensity decreasing in response to decreasing relative rotation between said synchronizer element and its coacting friction clutch element.

6. In a synchronizing transmission, a pair of axially aligned torque-transmitting members, movable jaw clutch and synchronizer elements drivingly associated with one member, said clutch element being movable axially and said synchronizer element being adapted to be urged under axial pressure into positive clutching and frictional driving engagement, respectively, with jaw and friction clutch elements drivingly associated with the other member, and a thrust element arranged to transmit axial thrust to said synchronizer element and to frictionally engage an interior surface of said movable clutch element with an intensity decreasing in response to decreasing relative rotation between said synchronizer element and the member with which it is engaged.

7. In a synchronizing transmission, a pair of axially aligned torque-transmitting members, movable jaw clutch and synchronizer elements drivingly associated with one member, said clutch element being movable axially and said synchronizer element being adapted to be urged under axial pressure into positive clutching and frictional driving engagement, respectively, with jaw and friction clutch elements drivingly associated with the other member, and a thrust element associated with said synchronizer element so as to transmit axial thrust thereto and so as to receive radially outwardly directed thrust therefrom while relative rotation exists between said synchronizer element and its cooperating friction clutch element, whereby to frictionally engage an interior surface of said movable clutch element under pressure which will be relaxed when synchronization is attained, whereby said movable clutch element, as it is urged axially, will transmit to said synchronizer element axial thrust having an intensity decreasing in response to decreasing relative rotation between said synchronizer element and its coacting friction clutch element and relaxing substantially entirely when synchronization is attained.

8. In a synchronizing transmission, a pair of axially aligned torque-transmitting members, movable jaw clutch and synchronizer elements drivingly associated with one member, said clutch element being movable axially and said synchronizer element being adapted to be urged under axial pressure into positive clutching and frictional driving engagement, respectively, with jaw and friction clutch elements drivingly associated with the other member, said synchronizer element being arranged to have limited circumferential movement relative to said movable clutch element and including blocking means adapted, when in one limit of such circumferential movement, to obstruct axial advance of said movable clutch element, and when in another position, to allow said movable clutch element to advance to positive clutching position, and a thrust member arranged to frictionally engage an interior surface of said movable clutch element and having an end associated with said synchronizer element so as to transmit axial thrust thereto and so as to develop a radially outwardly directed frictional engagement with said movable clutch element of intensity varying in accordance with the rate of relative rotation between said synchronizer element and the member with which it is in frictional engagement.

9. In a synchronizing transmission, a pair of torque-transmitting members mounted in axial alignment, an annular movable jaw clutch element surrounding and carried by one of said members and adapted to be moved into engagement with a jaw clutch element drivingly associated with the other member, thus to establish a positive drive connection between said members, said clutch element being provided with an internal axially extending, substantially semi-cylindrical notch, a synchronizer ring associated with said one torque-transmitting member, and having a circumferentially elongated recess, means for transmitting axial thrust from said movable clutch element to said synchronizer ring, said means comprising a cylindrical thrust member positioned in said notch having an end region extending into said recess and adapted to engage a portion of the synchronizer ring to transmit axial thrust thereto, and to engage circumferentially spaced regions of said recess so as to provide a lost motion driving connection between the synchronizer ring and the movable clutch element.

10. In a synchronizing transmission, a pair of torque-transmitting members mounted in axial alignment, an annular movable jaw clutch element surrounding and carried by one of said members and adapted to be moved into engagement with a jaw clutch element carried by the other member, thus to establish a positive drive connection between said members, a synchronizer ring associated with said one torque-transmitting member and having a circumferentially elongated recess, and a thrust member interposed between said movable clutch element and said synchronizer ring, said thrust member having an end region extending into said recess and adapted to engage a portion of the synchronizer ring to transmit axial thrust thereto, and to engage circumferentially spaced regions of said recess so as to provide a lost motion driving connection between the synchronizer ring and the movable clutch element, said recess having a radially outwardly facing circumferentially inclined ramp adapted to engage said end region of the thrust member and to wedge the thrust member against the movable clutch element so as to provide frictional engagement for transmitting axial thrust from the movable clutch element to the thrust member.

11. In a synchronizing transmission, a pair of torque-transmitting members mounted in axial alignment, an annular movable jaw clutch element surrounding and carried by one of said members and adapted to be moved into engagement with a jaw clutch element carried by the other member, thus to establish a positive drive connection between said members, a synchronizer ring associated with said one torque-transmitting member and having a circumferentially elongated recess, and a thrust bar arranged parallel to the axis of said members and operatively interposed between said movable clutch element and said synchronizer ring, said thrust bar having an end region extending into said recess and adapted to engage a portion of the synchronizer ring to transmit axial thrust thereto, and to engage circumferentially spaced regions of said recess so as to provide a lost motion driving connection between the synchronizer ring and the movable clutch element, said recess having a radially outwardly facing circumferentially inclined ramp adapted to engage said end region of the thrust bar and to wedge the thrust bar against the movable clutch element so as to provide frictional engagement for transmitting axial thrust from the movable clutch element to the thrust member.

12. In a synchronizing transmission, a pair of torque-transmitting members mounted in axial alignment, an annular movable jaw clutch element surrounding and carried by one of said members and adapted to be moved into engagement with a jaw clutch element drivingly associated with the other member, thus to establish a positive drive connection between said members, a synchronizer element associated with said one torque-transmitting member and adapted to be urged under axial pressure into frictional driving engagement with said other torque-transmitting member, a plurality of thrust bars disposed between said movable clutch element and said one torque-transmitting member, parallel to the axis of said members, and having purely frictional engagement with interior surfaces of said movable clutch element, and an annular spring arranged to yieldingly urge said bars radially outwardly into such frictional engagement, said bars being arranged to transmit thrust from said movable clutch element to said synchronizer element.

13. In a synchronizing transmission, a pair of axially aligned torque-transmitting members, movable jaw clutch and synchronizer elements drivingly associated with said one member, said clutch element being movable axially and said synchronizer element being adapted to be urged under axial pressure into positive clutching and frictional driving engagement, respectively, with jaw and friction clutch elements drivingly associated with the other member, said synchronizer element being arranged to have limited circumferential movement relative to said movable clutch element and including blocking means adapted, when in one limit of such circumferential movement, to obstruct axial advance of said movable clutch element, and when in another position, to allow said movable clutch element to advance to positive clutching position, and a thrust member arranged to frictionally engage an interior surface of said movable clutch element, said synchronizer element having a ramp surface adapted to exert radially outwardly directed pressure against said thrust member, of intensity decreasing in response to decrease in relative rotation of said synchronizer element and its coacting friction clutch element.

14. In a synchronizing transmission, a pair of axially aligned torque-transmitting members, a movable jaw clutch sleeve splined on one of said members for axial movement into positive clutching engagement with a jaw clutch element drivingly associated with the other member, a synchronizer ring associated with said one member, adapted to be urged under axial pressure into frictional driving engagement with said other member, arranged to have limited circumferential movement relative to said sleeve, and including blocking means adapted, when in one limit of such circumferential movement, to obstruct axial advance of said sleeve and, when in another position, to allow said sleeve to advance to positive clutching position, and a thrust bar, parallel to the axis of said members, arranged to frictionally engage an interior surface of said sleeve with an intensity decreasing in response to decreasing relative rotation between said synchronizer ring and the member with which it is engaged, and to transmit axial thrust from said sleeve to said synchronizer ring.

15. In a synchronizing transmission, a pair of torque-transmitting members mounted in axial alignment, an annular movable jaw clutch element surrounding and carried by one of said members and adapted to be moved into engagement with a jaw clutch element carried by the other member, thus to establish a positive drive connection between said members, a synchronizer element associated with said one torque-transmitting member and adapted to be urged under axial pressure into frictional driving engagement with said other torque-transmitting member, a thrust bar loosely received between said movable clutch element and said one torque-transmitting member parallel to the axis of said members, one end of said bar being engageable with a radially outwardly facing surface of said synchronizer element, and adapted to transmit axial thrust from said movable clutch element to said synchronizer element, and resilient means arranged to urge the other end of said bar radially outwardly whereby, when said movable clutch element is in positive clutch engaged position, said bar may fulcrum against an edge thereof so that its said one end may be urged radially inwardly into engagement with the synchronizer element as a result of the radially outward pressure against its said other end.

16. In a synchronizing transmission, a pair of torque-transmitting members mounted in axial alignment, a movable jaw clutch element carried by one of said members and adapted to be moved into engagement with a jaw clutch element carried by the other member, thus to establish a positive drive connection between said members, a synchronizer element having a lost motion driving connection with said one member and including blocking means adapted, in one of its positions permitted by said lost motion connection, to block the path of axial shifting movement of said movable clutch element and, in another of such positions, to allow the movable clutch element to complete its axial shifting movement, said synchronizer element having a friction clutch face associated with a coacting friction clutch face on said other member, and a spring loaded telescoping thrust member arranged to exert a constant light yielding pressure against said synchronizer element so as to cause the same to constantly receive torque from said coacting friction clutch plate and to thereby be biased in blocking relation to said movable clutch element, said thrust member having a purely frictional engagement with said movable clutch element, adapted to transmit axial thrust from said movable clutch element to said synchronizer element for augmenting said biasing action, whereby engagement of said movable clutch element against said blocking means may serve to transmit to the synchronizer element sufficient axial force for completion of synchronization.

17. In a synchronizing transmission, a pair of axially aligned torque-transmitting members to be synchronized, movable jaw clutch and synchronizer elements drivingly associated with one member, said jaw clutch element being movable axially and said synchronizer element being adapted to be urged under axial pressure into positive clutching and frictional driving engagement respectively with jaw and friction clutch elements drivingly associated with the other member, a plurality of thrust bars disposed between said movable clutch element and said one torque-transmitting member, parallel to the axis of said members, and adapted to have axial thrust receiving engagement with interior regions of said movable clutch element, and to transmit the thrust thus received to said synchronizer element, and an annular spring arranged to yieldingly urge all of said thrust bars radially outwardly to establish such thrust receiving engagement.

18. In a synchronizing transmission, a pair of axially aligned torque-transmitting members to be synchronized, movable jaw clutch and synchronizer elements drivingly associated with one member, said jaw clutch element being movable axially and said synchronizer element being adapted to be urged under axial pressure into positive clutching and frictional driving engagement respectively with jaw and friction clutch elements drivingly associated with the other member, a plurality of thrust elements adapted to have thrust receiving engagement with interior regions of said movable jaw clutch element and to transmit the thrust thus received to said synchronizer element, and an annular spring engaging and yieldingly urging all of said thrust elements radially outwardly to establish said thrust receiving engagement with the movable clutch element.

19. A synchronizing transmission as defined in claim 17, wherein said ring engages each thrust bar near one end thereof.

20. In a synchronizing transmission, a hub, a movable jaw clutch sleeve splined upon the rim thereof and shiftable axially into positive clutching engagement with a member to be synchronized with said hub, a synchronizer ring having an axially extending flange axially recessed into said hub and having a radially outwardly projecting flange, a plurality of thrust bars interposed between said hub and the movable jaw clutch element, their ends adapted to engage said radially outwardly projecting flange for urging said synchronizer ring into engagement with a cooperating friction clutch element drivingly associated with said member to be synchronized, and an annular spring disposed between the rim of said hub and said radially outwardly projecting flange, encircling said axially extending flange, and engaging end regions of said thrust bars so as to urge them radially outwardly into axial thrust receiving engagement with interior regions of said movable jaw clutch element.

21. In a synchronizing transmission, a pair of axially aligned torque transmitting members to be synchronized, movable jaw clutch and synchronizer elements drivingly associated with one member, said jaw clutch element being movable axially and said synchronizer element being adapted to be urged under axial pressure into positive clutching and frictional driving engagement respectively with jaw and friction clutch elements drivingly associated with the other member, the synchronizer ring being arranged to have limited circumferential movement relative to said movable jaw clutch element, and including blocking means adapted, when in one limit of such circumferential movement, to be engaged by and to receive thrust from said movable jaw clutch element for effecting synchronization, and a spring loaded telescoping member arranged to exert a constant light yielding pressure against said synchronizer element so as to cause the same to be normally biased in blocking position as a result of light transmission of torque between the friction surfaces.

22. In a synchronizing transmission, a hub, a pair of axially spaced torque transmitting members between which said hub is mounted in axial alignment therewith, a movable jaw clutch sleeve encircling said hub, drivingly connected thereto, and axially shiftable thereon into positive clutching engagement with positive clutch elements drivingly associated with the respective torque transmitting members, thereby to establish a positive drive connection between said hub and either of said members, a pair of synchronizer elements each having a lost motion driving connection with said hub and including blocking means adapted in one of its positions permitted by said lost motion connection, to block the path of axial shifting movement of said movable jaw clutch sleeve and, in another of such positions, to allow the movable jaw clutch sleeve to complete its axial shifting movement, said synchronizer elements each having a friction clutch face associated with a coacting friction clutch element drivingly associated with an adjacent torque transmitting member and adapted to be urged into frictional driving engagement therewith by axial pressure derived through the blocking engagement of said blocking means and movable jaw clutch sleeve, whereby to effect synchronization between said hub and the corresponding torque transmitting member, and means for causing the synchronizer elements to constantly receive torque from their coacting friction clutch elements and to thereby be biased in their blocking positions so as to insure initiation of synchronization, said means comprising an axially yieldable elongated element disposed between the hub and said movable jaw clutch sleeve and having its ends engaged under compression against the respective synchronizer elements.

23. In a synchronizing transmission, a hub, a pair of axially spaced torque transmitting members between which said hub is mounted in axial alignment therewith, a movable jaw clutch sleeve encircling said hub, drivingly connected thereto, and axially shiftable thereon into positive clutching engagement with positive clutch elements drivingly associated with the respective torque transmitting members, thereby to establish a positive drive connection between said hub and either of said members, a pair of synchronizer elements each having a lost motion driving connection with said hub and including blocking means adapted in one of its positions permitted by said lost motion connection, to block the path of axial shifting movement of said movable jaw clutch sleeve and, in another of such positions, to allow the movable jaw clutch sleeve to complete its axial shifting movement, said synchronizer elements each having a friction clutch face associated with a coacting friction clutch element, drivingly associated with an adjacent torque transmitting member and adapted to be urged into frictional driving engagement therewith by axial pressure derived through the blocking engagement of said blocking means and movable jaw clutch sleeve, whereby to effect synchronization between said hub and the corresponding torque transmitting member, and means for causing the synchronizer elements to constantly receive torque from their coacting friction clutch elements and to thereby be biased in their blocking positions so as to insure initiation of synchronization, said means comprising an axially yieldable elongated element extending axially of the hub and having its ends engaged under compression against said synchronizer elements.

SAMUEL O. WHITE.
PALMER ORR.